J. H. KENNEDY.
Combined Hydrant and Street-Washer.
No. 228,764. Patented June 15, 1880.
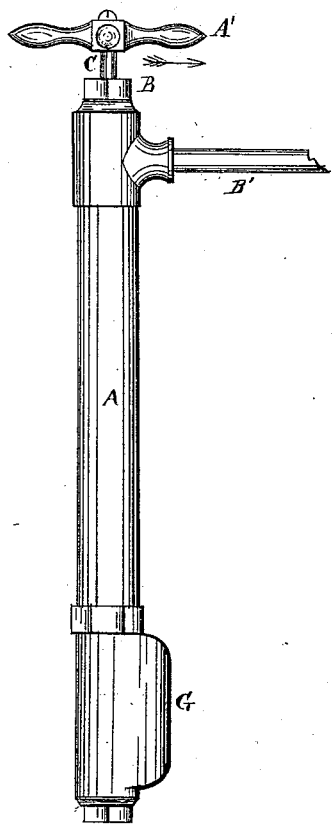
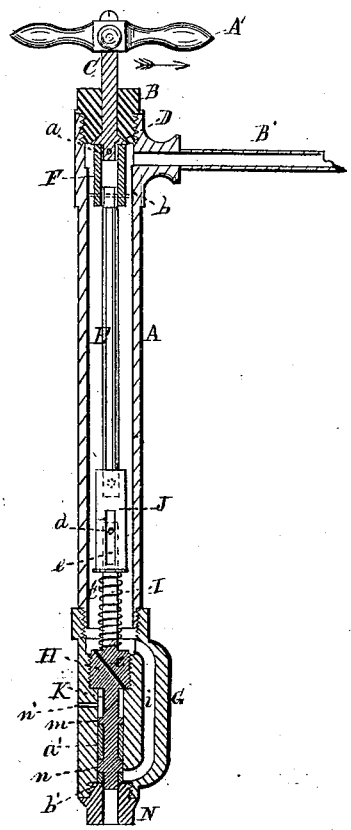

UNITED STATES PATENT OFFICE.

JOHN H. KENNEDY, OF CLEVELAND, OHIO.

COMBINED HYDRANT AND STREET-WASHER.

SPECIFICATION forming part of Letters Patent No. 228,764, dated June 15, 1880.

Application filed December 27, 1879.

*To all whom it may concern:*

Be it known that I, JOHN H. KENNEDY, of Cleveland, in the county of Cuyahoga and State of Ohio, have invented a certain new and Improved Hydrant and Street-Washer Combined; and I do hereby declare that the following is a full, clear, and complete description thereof.

This invention relates to an improvement in hydrants, the object of which is to produce a hydrant simple in construction and of easy manipulation, the same being an improvement on a hydrant for which a patent was granted to me August 29, 1876, No. 181,580.

A full detailed description of the construction of the hydrant and the practical operation thereof will be found as follows, reference being had to the accompanying drawings, making a part of this specification, in which—

Figure 1 is a side view of the hydrant. Fig. 2 is a vertical transverse section.

Like letters of reference refer to like parts in the several views.

In the drawings, A represents a tube or casing, in the upper end of which is screwed a nut, B, through which passes a stem, C. Near the lower end of the stem is a valve, D, having its seat in the end of the nut through which the stem passes. Said valve forms an integral part of the stem. The lower end of the said stem is attached to a valve-rod, E, by means of a sleeve-coupling, F, in the upper end of which the end of the stem is inserted, and secured therein by a pin, a. The upper end of the valve-rod is inserted in the coupling, and secured therein by a pin, b. The ends of the stem and valve-rod are not rigidly made fast in the coupling, but are a little loose, to allow the valves to adjust themselves properly to their respective seats. Said pins a and b pass through the coupling-sleeve at right angles to each other, thereby making a free connection for the purpose above-said.

To the lower end of the tube A, alluded to, is connected a valve-chamber, G, in which is screwed a plug, H, provided with a stem, I, whereby it is attached to the valve-rod E, above referred to, by a socket, J, wherein the end of the stem I is inserted. Said stem is secured in the socket by a pin, d, passing through the end of the stem and through a slot, e, in the socket, for the pin to move in, substantially as shown in the drawings.

The socket J is connected to the valve-rod E in the same way as its upper end is connected to the coupling F.

From the lower end of the screw-plug H is a pendent stem, K, which may be considered a continuation of the stem I. On said stem are two collars, m and n, fitting closely in the bore of the chamber. Between said collars is a packing, a', of any suitable material, for making water-tight the stem and collars in the bore of the said chamber. On the stem projecting below the collar n is a valve, b', which may be of leather or of any other fitting material. The seat of the valve is a coupling-nut, N, screwed into the lower end of the chamber. i is a conduit communicating with the space above the screw-plug H and the lower part of the bore of the chamber, as shown in Fig. 2.

The operation of the hydrant is as follows: By means of the nut N, forming the end of the chamber, the hydrant is attached to the water-main by a pipe or otherwise, the hydrant being set in the ground for that purpose in the usual manner. The position of the working parts of the hydrant, as shown in the drawings, is such as when closed, shutting off the water.

In order to open the hydrant for drawing water, the valve b' is opened by turning the handle A' in direction of the arrow, thereby turning the screw-plug H upward, consequently lifting said valve b' from its seat. Water will now flow into the conduit i, and pass therefrom around the screw-plug into the pipe A, rising therein to the spout B', from which it flows, it not being able to pass up around the stem C, in consequence of the valve D, which is continued in its seat by the resiliency of the spring C'. The spring not only keeps the valve D closed, but it also forces down the valve b' when the rod is turned for closing it. The water left in the hydrant on closing said valve b' flows therefrom through the drain-bore c, made in the screw-plug, thence to the outside through the vent n', leaving no water in the hydrant to freeze up in cold weather.

The advantage of this my present hydrant over my former one, above alluded to, is that no water from the main pipes can force its way through the lower valves into the interior of the shell or casing, thereby preventing the hydrant from freezing up in cold weather.

This hydrant is more simple in structure, and the operative parts are more durable, than the cam and pins in my patented hydrant; hence it is less liable to get out of order, and can be taken up for repairs with less labor and expense.

What I claim as my invention, and desire to secure by Letters Patent, is—

1. In hydrants, the screw-plug H, provided with a drain-hole, $c$, vent $n'$, and pendent stem having packed collars $n$ $m$, in combination with the conduit $i$, spring $C'$, stem I, socket J, rod E, and coupling F, constructed and arranged substantially as and for the purpose set forth.

2. In hydrants, the conduit $i$, plug H, with its pendent stem and packed collars, arranged within the valve-chamber between the upper and lower openings of said conduit, in combination with the spring $C'$ and stem I, attached to the stem E by means of the socket-connection J, arranged within the exterior casing or shell, substantially as and for the purpose set forth.

JOHN H. KENNEDY.

Witnesses:
C. J. SANKER,
F. W. BENNETT.